United States Patent [19]

Sundstrom

[11] Patent Number: 5,082,144
[45] Date of Patent: Jan. 21, 1992

[54] RETAINER CLIP FOR FLEXIBLE TUBE

[76] Inventor: Clinton J. Sundstrom, 3376 Marisma, San Mateo, Calif. 94403

[21] Appl. No.: 695,954

[22] Filed: May 6, 1991

Related U.S. Application Data

[63] Continuation-in-part of Ser. No. 628,453, Dec. 17, 1990, abandoned.

[51] Int. Cl.⁵ .............................................. B65D 35/32
[52] U.S. Cl. ................................................... 222/99
[58] Field of Search .............................. 222/97, 99, 103

[56] References Cited

U.S. PATENT DOCUMENTS

| | | | |
|---|---|---|---|
| 1,941,631 | 1/1934 | Socoloff et al. | 222/97 |
| 1,987,428 | 1/1935 | Whiteman | 222/99 |
| 2,754,031 | 7/1956 | Ostrov et al. | 222/99 |
| 4,664,293 | 5/1987 | Sheppard | 222/99 |
| 5,014,879 | 5/1991 | Hill | 222/99 |

FOREIGN PATENT DOCUMENTS

| | | | |
|---|---|---|---|
| 0047447 | 3/1982 | European Pat. Off. | 222/99 |
| 86244 | 3/1936 | Netherlands | 222/99 |
| 9008072 | 7/1990 | PCT Int'l Appl. | 222/99 |

Primary Examiner—Donald T. Hajec
Assistant Examiner—Gregory L. Huson
Attorney, Agent, or Firm—T. R. Zegree

[57] ABSTRACT

A durable and reusable retainer clip for use in connection with a flexible tube containing a pasty material, such as toothpaste, comprises a rectangular body having a slot for insertion of the sealed end of the tube. The clip includes a rotatable holder on each side thereof adapted for gripping and holding folded flat segments of the tube in a neatly arranged position.

15 Claims, 2 Drawing Sheets

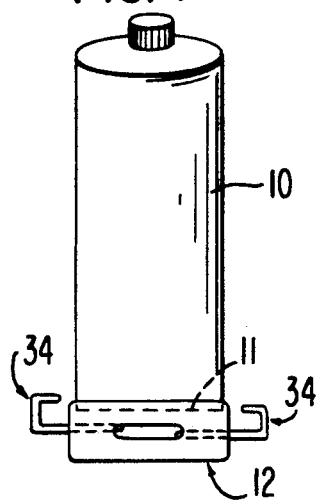
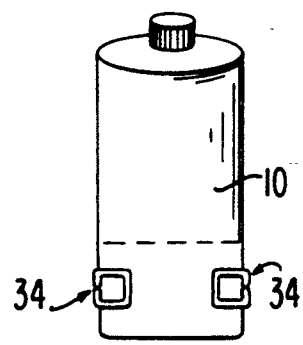
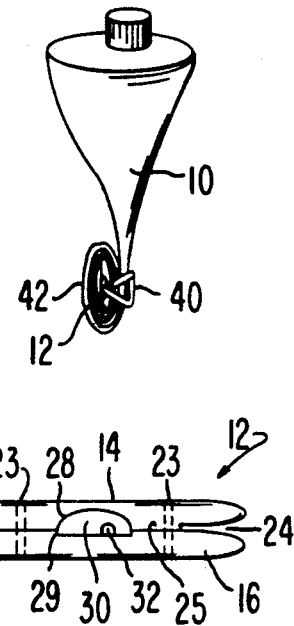
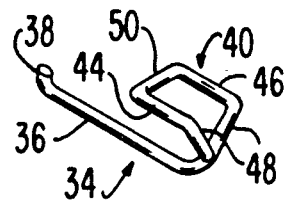
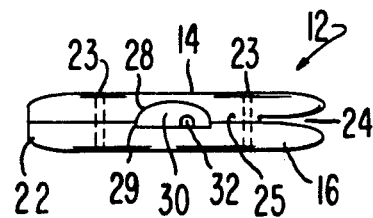
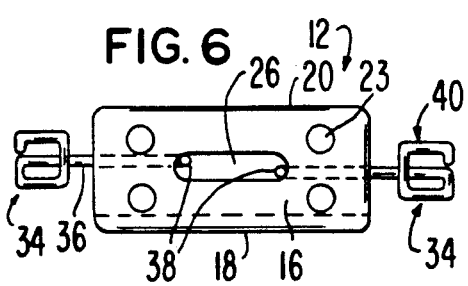
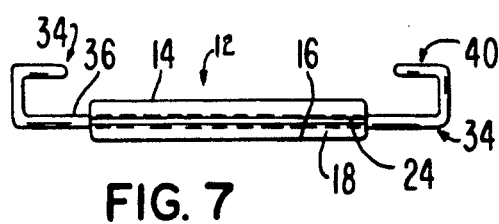
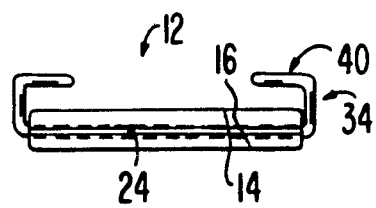
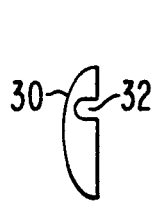
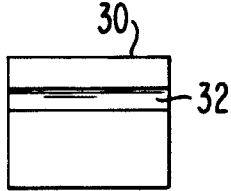
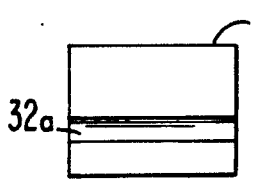
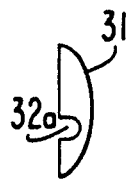

RETAINER CLIP FOR FLEXIBLE TUBE

BACKGROUND OF THE INVENTION

This application is a continuation-in-part application of my U.S. patent application Ser. No. 07/628,453 filed Dec. 17, 1990, entitled "Retainer Clip for Flexible Tube", now abandoned.

This invention relates to an improved retainer clip for a flexible tube. More particularly, the invention relates to a retainer clip, the construction of which is adapted to support and hold folded segments of a flexible tube containing a pasty material, such as a toothpaste.

As is well known, toothpaste or other pasty materials contained in the conventional plastic tubes is dispensed gradually over a period of time by pressing manually the body of the tube to express a desired amount of paste through the tube's nozzle. It is also known that, quite frequently, the user applies pressure in the central area or adjacent the nozzle area of the tube so that while a paste is dispensed from the front portion of the tube, a substantial amount of the paste remains in the sealed end portion of the tube after it has been deformed by repeated pressure in the front portion thereof and eventually the tube is discarded with a certain amount of paste being unused and thus wasted.

In an attempt to remedy this situation, certain types of retainer devices for collapsible tubes have been described in the patent literature. For example, U.S. Pat. No. 1,941,631 to Socoloff et al describes a cylindrical roll provided with a retaining member and secured to the bottom of a collapsible tube, whereby the contents of the tube are expelled by rolling or coiling action of the tube. U.S. Pat. No. 2,754,031 to Ostrov et al discloses a coiling device for a dispensing tube having a key which is manually turned to wind the end of the tube in a tight coil form.

While the aforementioned patents disclose the general concept of retainer devices having different forms, the retainer clip of this invention provides a new approach to the structure of such device which offers certain advantages over the prior art devices.

OBJECTS OF THE INVENTION

In view of the foregoing, it is the principal object of the invention to provide a lightweight sturdy retainer clip adapted for supporting folded segments of a flexible tube filled with a paste.

Another object of the invention is to provide a detachable and reusable device for holding emptied folded portions of a flexible tube together when its pasty contents have been partially dispensed from its lower area.

A further object of the invention is to provide a unitary retainer device for a tube of toothpaste or the like pasty material which is of novel construction and can readily be attached to the sealed bottom portion of the tube which is folded gradually as its contents are dispensed into flat, substantially rectangular in shape segments corresponding in size to the width of the retainer device and which are held together without being unfolded while the tube is still in use.

Still another object of this invention is to provide a small and compact retainer clip of the character described herein which can easily be manufactured in volume quantities at a low cost from readily available materials.

BRIEF SUMMARY OF THE INVENTION

These and other objects of the present invention will become more fully apparent from the following description taken in conjunction with the accompanying drawings.

In accordance with the invention, there is provided a retainer clip for a flexible tube containing a pasty material comprising a) a generally flat, substantially rectangular body which comprises a top wall, a bottom wall, a front wall, a rear wall and a pair of opposite side walls; b) a slot in said front wall extending along the length thereof; c) a longitudinal opening in said bottom wall; d) an aperture in the central portion of each of said side walls adapted for passageway of support means; e) a pair of support means sungly inserted in each of said apertures, each of said support means comprising a longitudinal groove disposed on each side of said side walls, said holder being adapted to be slidably movable in said groove in the spacing between said top wall and said bottom wall; (g) each of said holders having a curved projection at the inner end of elongated rod and a loop at the outer end thereof, said loop projecting outwardly of said body and being adapted for holding a plurality of substantially flat layers of the folded tube.

BRIEF DESCRIPTION OF THE DRAWINGS

In the accompanying drawings, wherein like reference characters designate corresponding elements throughout the views thereof:

FIG. 1 is a general view illustrating a flexible tube of toothpaste in its upright position with the retainer clip of the invention mounted on the sealed end of the tube in operative position;

FIG. 2 is a similar view of the tube, the lower portion of which has been folded over the retainer clip according to the invention, the folded segments being gripped by the clip;

FIG. 3 is a side elevational view of the tube showing a few folded segments thereof gripped and held together by the loop of the holder;

FIG. 4 is an enlarged perspective view of the holder itself with the body of the retainer clip omitted;

FIG. 5 is an enlarged view of a side wall of the retainer clip showing a support inserted in the aperture thereof;

FIG. 6 is a plan view of the retainer clip's bottom wall showing the longitudinal opening therein and both holders in extended position;

FIG. 7 is a view of the front wall of the retainer clip with both holders in extended position;

FIG. 8 is a view similar to FIG. 7 with both holders in retracted position;

FIG. 9 is a side view of the first support for a holder showing an off-center recess;

FIG. 10 is a plan view of of the support of FIG. 9 showing the entire recess positioned off-center in one direction;

FIG. 11 is a plan view of the second support showing a recess positioned off-center in the opposite direction;

FIG. 12 is a side view of the support shown in FIG. 11;

DETAILED DESCRIPTION OF THE INVENTION

Figure 13:
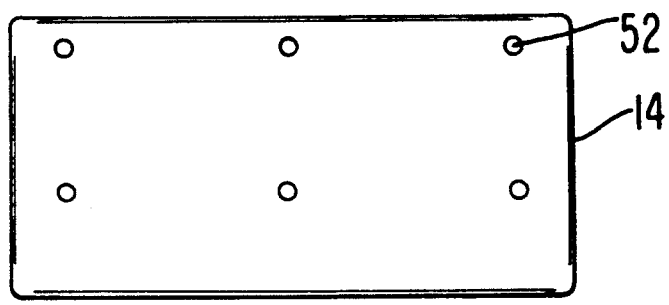
FIG. 13 is an enlarged plan view of the top wall showing tops of the inserted pins.
Figure 14:
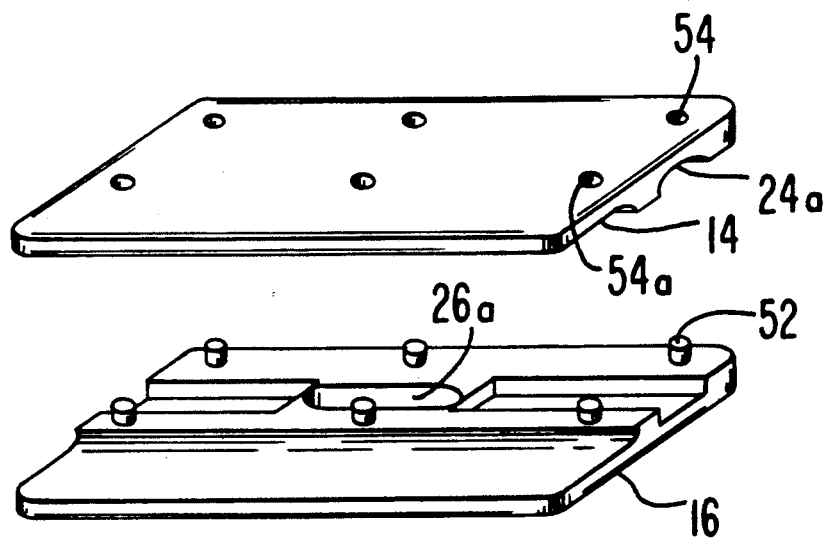
FIG. 14 is an enlarged and exploded perspective view of the top wall and of the bottom wall prior to being secured together showing the off-center position of the opening in the bottom wall and the respective locations of the pins and of the registering holes.

Referring now to the drawings, a conventional, flexible plastic tube 10 filled completely with a toothpaste is shown in FIG. 1 in combination with retainer clip 12 according to the invention, whereby the sealed end 11 of tube 10 is inserted in the slot of the clip, as indicated in dotted lines. FIGS. 2 and 3 illustrate a similar tube from which a substantial portion of toothpaste has been expressed by pressing with fingers the end portion of the tube which was being gradually folded into generally flat segments 42 surrounding the width of clip 12, such segments being held together in neat and compact form by loops 40 disposed on each side of retainer clip 12. As shown in FIGS. 4 to 14, clip 12 is formed by top wall 14 which is firmly secured to bottom wall 16 by a plurality of fastening means, such as rivets 23 driven through the bodies of both walls 14 and 16 in parallel relation on each side of clip 12. The two walls 14 and 16 may also be secured together by a plurality of upright pins 52, preferably five or six formed in parallel from the same material as walls 14 and 16 preferably during molding of the walls as an integral part of bottom wall 16. Pins 52 project upwardly from the upper surface of bottom wall 16, as shown in FIG. 14 and engage in a tight fit with registering holes 54 provided in top wall 14. Holes 54 are preferably disposed in two parallel rows, as illustrated in FIG. 13, with two holes being located close to one edge of top wall 14 and three holes 52a being located somewhat more distant from the opposite edge of top wall 14. To insure a firm engagement between pins 52 and holes 54, 54a, the diameter of all holes is slightly smaller than that of pins 52. Thus, by way of an example, pins 52 are from about ⅛ in. to ¼ in. long and have a diameter of about 3/32 in. Clip 12 further comprises narrow front wall 18 and rear wall 20 of substantially the same size. Front wall 18 includes a narrow, horizontally positioned slot 24 between top wall 14 and bottom wall 16 extending throughout the length of the two walls. The generally rectangular body of clip 12 also comprises a pair of opposite side walls 22, the configuration of which is substantially identical.

In order to form slot 24 between top wall 14 and bottom wall 16, a short jut 25 is provided on the lower surface of top wall 14 adjacent aperture 28 so that the bottom surface of top wall 14 extends horizontally from jut 25 to the outer edge thereof producing a spacing between top wall 14 and bottom wall 16 of about 3/100 inch which forms a slot 24 having a width adapted for a snug fit with the sealed end of tube 10. As illustrated in FIG. 14, slot 24 is formed by upper arcuate recess 24a in top wall 14 and lower registering arcuate recess 24b in bottom wall 16 when the two walls are secured together.

Aperture 28, shown in FIG. 5, is of substantially the same configuration in each side wall 22 of clip 12 with its arcuate top portion and flat bottom having a small recess 29 extending horizontally in the center portion thereof. The dimensions of apertures 28 are specifically adapted for a tight fit with first support 30 and second support 31 inserted in apertures 28 between top wall 14 and bottom wall 16. To insure that supports 30 are maintained in fixed position, they may be spot-welded on each side of clip 12.

It is an important feature of the invention to provide each support means 30 and 31 with a longitudinal groove 32 disposed off-center in the bottom of first support means 30 toward slot 24, while the other groove 32a in the opposite support means is disposed likewise off-center but toward the opposite direction, as illustrated in FIGS. 9 to 12, both grooves being disposed substantially parallel to each other when support means 30 and 31 are inserted in their respective apertures 28. Such novel arrangement permits rods 36 of holder 34 to move slidingly in parallel path of travel in the same horizontal plane within the spacing between top wall 14 and bottom wall 16 without interfering in their movement. When in retracted position, the inner ends of rods 36 are overlapping in close proximity, while when in extended position, the free inner ends of rods 36 are spaced apart from each other, as shown in FIG. 6.

Rotatable holders 34 disposed on each side of side walls 32 represent another important feature of the invention. As shown in FIG. 4, each holder 34 comprises an elongated rod 36 having a short curved projection 38 at one end thereof to insure that approximately one-half of the length of each rod 36 will be held inside retainer clip 12 when each rod is in extended position, as illustrated in FIG. 6, while each remaining portion of rods 36 overlaps the other when the rods are in retracted position. Each rod 36 terminates at its opposite end in a loop 40 which is extendible outwardly beyond the width of tube 10. When rods 36 are returned to their retracted position, each loop has a capacity of accomodating two or three emptied folded layers of tube 10 on each side thereof and hold them for as long as the user desires. Loop 40 is formed from the same material as rod 36 and comprises a generally upright portion of substantially V configuration 48 extending from the outer end of rod 36 and a pair of first horizontal portions 44,46 of the same size extending backward from top of each leg of V and disposed in parallel to rod 36 and a single second horizontal portion 50 in the same plane linking the ends of each first horizontal portion 44 and 46. It will be understood that each loop 40 is adapted for a gripping and retaining engagement of one or two emptied folded segments 42 of tube 10 on one side of clip 12 and up to three folded segments of tube 10 on its opposite side.

As illustrated in FIG. 6, a longitudinal opening 26 is provided in the central portion of bottom wall 16 to enable portions of rods 36 ending with short curved projections 38 to be slidingly movable back and forth between top wall 14 and bottom wall 16 by rotating them in clockwise or counter-clockwise direction up to 360° to locate a suitable position in which curved projections 38 will not interfere with each other during sliding movement of rods 36. When pins 52 are employed in assembling retainer clip 12, it is preferred to arrange the location of opening 26a in bottom wall 16 somewhat off-center thereof, as shown in FIG. 14, for example ½ in. from the horizontal edge thereof and about ⅜ in. from the opposite edge.

While the width of front wall 18 and parallel rear wall 20 may vary to some extent, it is usually adapted to accomodate sealed ends 11 of tubes 10 having widths from about 1½ to 2½ inches, most frequently from 1¾ to 2 inches.

The body of retainer clip 12, including pins 52 may be manufactured from any suitable hard and sturdy plastic material, such as polyethylene or ABS, by any well known injection molding procedure. Holders 34 may be fabricated from a single rigid but bendable wire, such as stainless steel wire or a music wire of from 1/16 in. to 3/32 in. diameter. The music wire may be chrome-plated, if desired.

It will be apparent from the foregoing description that I have devised an improved lightweight compact, durable and reusable retainer clip which is useful in folding a tube into segments of substantially the same size and retaining firmly in place the emptied inwardly folded segments on both sides of the tube containing an extrudable pasty material, such as toothpaste, various medicated or cosmetic creams, ointments, glues and the like materials. Due to its small size, preferably 1×2 inches, the retainer clip may be conveniently packaged and marketed separately or together with a tube of pasty material. After a paste has been dispensed from a tube, the clip can easily be detached therefrom and reused for attachment to another tube. In view of simplicity of its construction, the retainer clip of the present invention may be manufactured inexpensively in a large volume.

It will be understood that various modifications in the form or in the constructional details of my invention as herein described may be made without departing from the spirit thereof or the scope of the claims which follow.

I claim:

1. A retainer clip for a flexible tube containing a pasty material comprising:
   (a) a generally flat, substantially rectangular body which comprises a top wall, a bottom wall, a front wall, a rear wall and a pair of side walls;
   (b) a slot in said front wall extending throughout the length thereof;
   (c) a longitudinal opening in said bottom wall;
   (d) an aperture in the central portion of each of said side walls for insertion of a support means;
   (e) a pair of support means snugly inserted in each of said apertures, each of said support means including a longitudinal groove disposed off-center thereof;
   (f) a rotatable holder disposed on each side of said side walls, each of said holders being adapted to be slidably movable in said grooves in the spacing between said top wall and said bottom wall;
   (g) each of said holders comprising an elongated rod with a curved projection at an inner end thereof and a loop at an outer end thereof, said loop projecting outwardly of said body and being adapted for holding a plurality of substantially flat layers of the folded tube.

2. A retainer clip of claim 1 wherein said pasty material comprises a toothpaste.

3. A retainer clip of claim 1 wherein said top wall and said bottom wall are firmly secured together by a plurality of fastening means.

4. A retainer clip of claim 1 wherein said top wall includes a small jut on the lower surface thereof adjacent said aperture, thereby forming said slot.

5. A retainer clip of claim 1 wherein the width of said slot is adapted for a snug fit of sealed end of said tube.

6. A retainer clip of claim 1 wherein a top portion of each said aperture is of arcuate configuration.

7. A retainer clip of claim 1 wherein the outer configuration of each said support means is adapted for snug fit in said aperture.

8. A retainer clip of claim 1 wherein said longitudinal groove in the first support means is disposed off-center toward said slot and said longitudinal groove in the second support means is disposed off-center in an opposite direction.

9. A retainer clip of claim 1 wherein said rotatable holders are disposed in parallel relation to each other in the same plane, said elongated rods overlapping when in retracted position.

10. A retainer clip of claim 1 wherein said loop comprises a generally upright portion of substantially V configuration extending from the end of said rod, a pair of first horizontal portions extending from each leg of said V and a second horizontal portion linking the ends of said first horizontal portions.

11. A retainer clip of claim 10 wherein each of said loops is adapted for gripping and retaining engagement with at least one folded segment of said tube.

12. In combination, a flexible tube filled with a dispensable pasty material and the retainer clip of claim 1 mounted on a sealed end of said tube.

13. A retainer clip of claim 3 wherein said fastening means comprises rivets.

14. A retainer clip of claim 3 wherein said fastening means comprises pins projecting upwardly from said bottom wall for engagement with registering holes in said top wall.

15. A retainer clip of claim 14 wherein said longitudinal opening is positioned off-center in said bottom wall.

* * * * *